(12) United States Patent
Friedlander, III et al.

(10) Patent No.: US 7,762,195 B2
(45) Date of Patent: Jul. 27, 2010

(54) SLOW COOK OFF ROCKET IGNITER

(75) Inventors: Mark P. Friedlander, III, Centreville, VA (US); Robert E. Black, III, Centreville, VA (US); Julia Venarchick, Fairfax, VA (US)

(73) Assignee: Aerojet - General Corporation, Gainesville, VA (US)

( * ) Notice: Subject to any disclaimer, the term of this patent is extended or adjusted under 35 U.S.C. 154(b) by 56 days.

(21) Appl. No.: 12/148,027

(22) Filed: Apr. 16, 2008

(65) Prior Publication Data
US 2009/0044716 A1    Feb. 19, 2009

Related U.S. Application Data

(60) Provisional application No. 60/930,172, filed on May 14, 2007.

(51) Int. Cl.
*F02K 9/00* (2006.01)
(52) U.S. Cl. .................... 102/380; 89/1.812
(58) Field of Classification Search ............ 60/242, 60/223, 39.091; 102/380; 89/1.812, 1.8, 89/1.801, 1.806, 1.807
See application file for complete search history.

(56) References Cited

U.S. PATENT DOCUMENTS

| | | | | |
|---|---|---|---|---|
| 2,434,652 A | * | 1/1948 | Hickman | 60/39.47 |
| 2,870,599 A | * | 1/1959 | Long | 60/253 |
| 2,909,032 A | * | 10/1959 | Davies | 60/253 |
| 3,052,091 A | * | 9/1962 | D'Ooge | 60/254 |
| 3,059,425 A | * | 10/1962 | McSherry et al. | 60/242 |
| 3,171,248 A | * | 3/1965 | Ledwith | 60/219 |
| 3,461,672 A | * | 8/1969 | Eliis et al. | 60/256 |
| 3,948,042 A | * | 4/1976 | Beardsley et al. | 60/242 |
| 4,458,482 A | * | 7/1984 | Vetter et al. | 60/253 |
| 4,494,373 A | * | 1/1985 | Vetter et al. | 60/253 |
| 4,557,197 A | | 12/1985 | Smith et al. | 102/202 |
| 4,709,637 A | * | 12/1987 | Boggero | 102/481 |
| 5,035,182 A | * | 7/1991 | Purcell et al. | 102/481 |
| 5,038,559 A | * | 8/1991 | Blackmore | 60/204 |

(Continued)

FOREIGN PATENT DOCUMENTS

WO    WO 01/34516    5/2001

OTHER PUBLICATIONS

NIMIC Lettre du Newsletter, NATO Insensitive Munitions Information Center, 4$^{th}$ Quarter 2002, pp. 1-10.

*Primary Examiner*—Michael Carone
*Assistant Examiner*—Reginald Tillman, Jr.
(74) *Attorney, Agent, or Firm*—Wiggin and Dana LLP; Gregory S. Rosenblatt

(57) ABSTRACT

A gas generating propulsion system includes an igniter containing an igniter propellant and an auto igniter. A rocket motor is coupled to the igniter and has a housing containing a main propellant, a rocket motor throat and a nozzle. A release port extends through a portion of the rocket motor. This gas release port has a variable diameter through bore in fluid communication with the main propellant. In this way, the through bore has a variable area that forms an unobstructed open area with a cross-section effective to discharge gas generated by the main propellant such that a pressure increase within the housing remains below a safety value for the housing.

19 Claims, 4 Drawing Sheets

U.S. PATENT DOCUMENTS

| | | | |
|---|---|---|---|
| 5,129,326 A * | 7/1992 | Brogan | 102/481 |
| 5,228,285 A * | 7/1993 | Van Name et al. | 60/253 |
| 5,311,820 A * | 5/1994 | Ellingsen | 102/481 |
| 5,390,487 A * | 2/1995 | Moore et al. | 60/256 |
| 5,394,690 A * | 3/1995 | Arszman et al. | 60/233 |
| 5,443,286 A * | 8/1995 | Cunningham et al. | 280/741 |
| 5,579,636 A * | 12/1996 | Rosenfield | 60/251 |
| 5,735,114 A * | 4/1998 | Ellingsen | 60/39.1 |
| 5,813,219 A * | 9/1998 | Gill et al. | 60/223 |
| 6,007,097 A | 12/1999 | Rink et al. | 280/737 |
| 6,035,631 A * | 3/2000 | Cannon | 60/255 |
| 6,619,029 B2 * | 9/2003 | Solberg et al. | 60/223 |
| 6,966,264 B2 * | 11/2005 | Solberg et al. | 102/381 |
| 7,033,449 B2 | 4/2006 | Schaefer et al. | 149/92 |
| 7,051,511 B2 * | 5/2006 | Prytz | 60/223 |
| 7,509,796 B2 * | 3/2009 | Hansen | 60/225 |

* cited by examiner

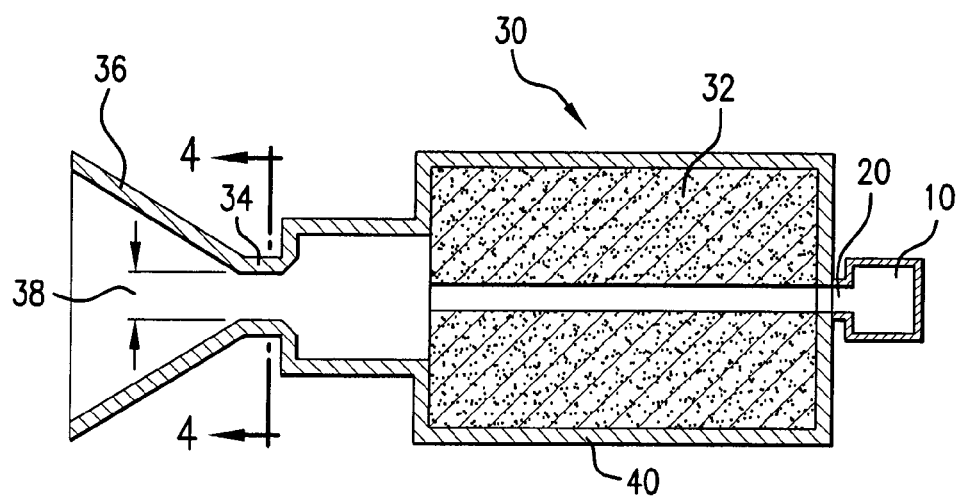
FIG.3
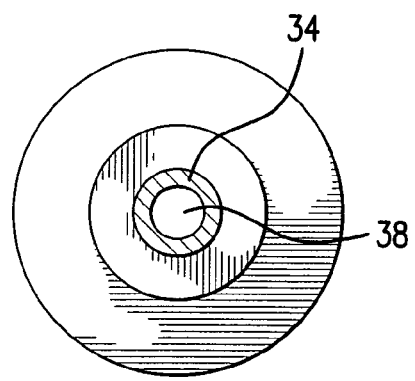 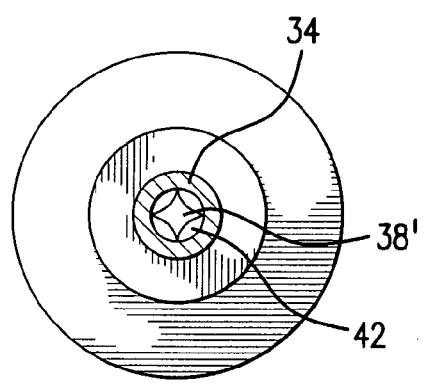
FIG.4A				FIG.4B

US 7,762,195 B2

SLOW COOK OFF ROCKET IGNITER

CROSS REFERENCE TO RELATED APPLICATION(S)

This patent application claims priority to U.S. Provisional Patent Application Ser. No. 60/930,172 titled "Slow Cook Off Rocket Igniter" that was filed on May 14, 2007. The subject matter of that provisional patent application is incorporated by reference in its entirety herein.

U.S. GOVERNMENT RIGHTS

The invention was made with U.S. Government support under contract W311P4Q-04-C-0059 awarded by the United States Army. The U.S. Government has certain rights in the invention.

BACKGROUND OF THE INVENTION

1. Field of the Invention

This invention relates to a propulsion system, such as a rocket motor to propel a missile. More particularly, an auto igniting composition is combined with an igniter and a variable diameter throat. In a slow cook off environment, with the throat having a relatively large diameter, a low pressure propellant burn occurs effectively venting gases and minimizing the risk of damage to the propulsion system, the generation of shrapnel, and the unintended propulsion of the missile.

2. Description of the Related Art

Gas generating propulsion systems, such as pyrogen propulsion systems, generate thrust by the burning of a propellant. As the propellant burns, a copious volume of gas is generated along with heat that expands the volume of generated gas. As this gas is expelled through a nozzle, thrust is generated. The thrust may be used to propel a missile to a target.

During a slow heating environmental exposure, unintended ignition of the propellant may lead to rupture of the propulsion system generating dangerous shrapnel. Greater damage may be caused if an attached missile is propelled in an uncontrolled launch. One cause of unintended ignition is referred to as slow cook off. When the propellant is exposed to temperatures above about 200° C., such as in a burning warehouse, the explosive composition undergoes a rapid, exothermic decomposition that may lead to a violent reaction or explosion. To satisfy the U.S. Government's and NATO's Insensitive Munitions (IM) requirements, a propulsion system must undergo slow cook off without propulsion and without generating shrapnel that travels an extended distance.

One method to reduce slow cook off danger is disclosed in U.S. Pat. No. 5,228,285 to Van Name et al. A rocket motor housing has vent slits sealed with a resin wrap. At a temperature above normal storage temperature, but below the propellant decomposition temperature, the resin wrap melts or loses strength to open the vent slits providing an exhaust for gases generated. U.S. Pat. No. 6,966,264 to Solberg et al., discloses a controlled bursting of the housing, such as by a weld failure or housing crack, to provide an exhaust for gases generated. Both U.S. Pat. Nos. 5,228,285 and 6,966,264 are incorporated by reference herein in their entireties.

While these methods vent gases generated during slow cook off and likely prevent unintended propulsion or shrapnel expulsion, typically the rocket motor housing may not be reused after such an event and/or the motor gases are vented radially or in an uncontrolled manner or direction. There remains a need for a rocket motor in which the propellant may undergo slow cook off without unintended propulsion, side venting or shrapnel expulsion that, in accordance with some embodiments, may be recharged and reused following the slow cook off (although reuse is not possible in some cases).

BRIEF SUMMARY OF THE INVENTION

The details of one or more embodiments of the invention are set forth in the accompanying drawings and the description below. Other features, objects and advantages of the invention will be apparent from the description and drawings, and from the claims.

In one embodiment, there is provided a gas generating propulsion system which includes a housing having, in sequence, a propellant containing section, an igniter containing section, a throat and a nozzle. An auto igniter is disposed within the propulsion system, such as between the igniter assembly and the main propellant charge. The nozzle has a through bore or area with a diameter that forms an open area with a cross-section sufficiently large to discharge gas generated by the propellant whereby a pressure increase within the housing remains below a rupture value for the housing.

The nozzle through bore has a variable cross-sectional area that is larger in a safe position as compared to an armed position. In one embodiment, the cross sectional area is varied by a valve that may be aligned along a longitudinal axis of the through bore. The valve is in a first position during transport and storage and a second position when the system is deployed. When the valve in a first, "safe", position, the open area of the throat is not significantly reduced. When in a second, "armed", position the valve reduces the open area by an amount effective to restrict discharge gas generated by the propellant such that a pressure increase within the housing generates thrust.

BRIEF DESCRIPTION OF THE DRAWINGS

FIG. 3 is a cross-sectional view a rocket motor propulsion system.

FIG. 4 is a frontal view of a first valve illustrating the propulsion system in both a safe, FIG. 4A, and armed, FIG. 4B, position.

Like reference numbers and designations in the various drawings indicate like elements.

DETAILED DESCRIPTION

Figure 1:
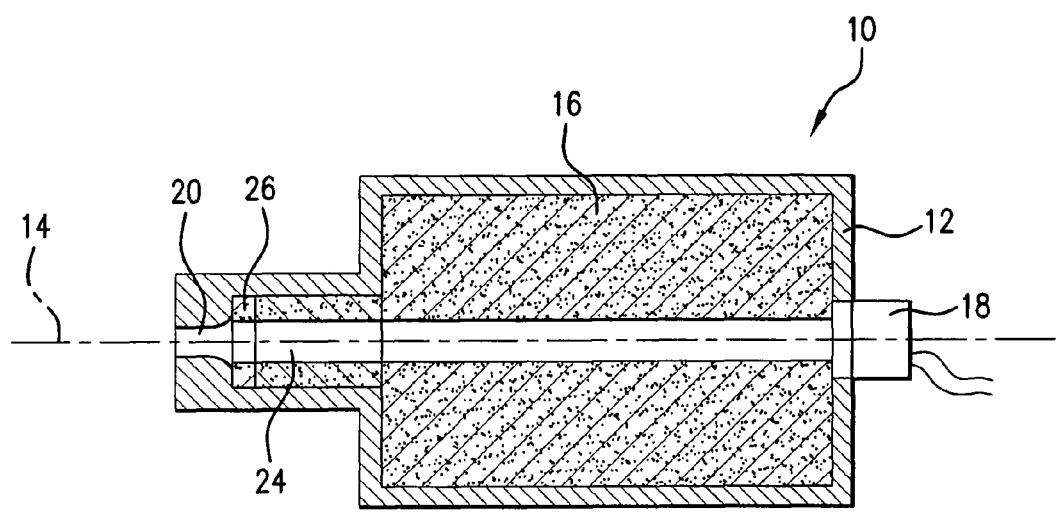
FIG. 1 is a cross-sectional view of an igniter for use with an embodiment of the propulsion system of the invention.

An igniter 10 for a gas generating propulsion system, such as a rocket motor, as illustrated in cross-sectional representation in FIG. 1, includes a housing 12 having a generally cylindrical cross-section symmetric about a longitudinal axis 14. Contained within the housing 12 are an igniter propellant 16, an initiator 18, and a throat 20.

An exemplary composition for the initiator 18 is an energetic materials composition containing $BKNO_3$ (boron potassium nitrate). The igniter may be a pyrotechnic charge of $BKNO_3$ as well as a pyrogen charge of ammonium perchlorate and HTPB (hydroxyl-terminated polybutadiene). In intended operation, igniter 10 is ignited such as by an electrical discharge via the initiator 18. A flame front travels up through internal channel 24 to ignite the igniter propellant 16.

As igniter propellant 16 burns, copious amounts of gas and heat are generated. The hot expanding gases are expelled through igniter throat 20 to ignite a main propellant charge. The igniter propellant 16 is typically a pyrogen, rubberized coherent mass, but a pyrotechnic, pellets or granules would also be acceptable.

Figure 2:
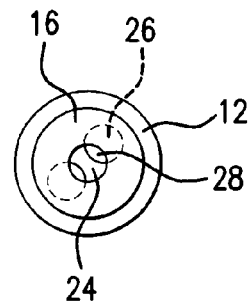
FIG. 2 is a top view of an igniter and auto igniter utilized in the propulsion system of FIG. 1.

The exemplary propellants thermally decompose at a temperature on the order of 200° C.-300° C. The decomposition products may generate an explosive mix or sufficient pressure to violently rupture igniter housing 12 or the main motor housing generating shrapnel. To reduce the risk of such an occurrence when, for example, the rocket motor is exposed to the heat of a fire, an auto igniter 26 is disposed between the throat 20 and the igniter 16. While the auto igniter may take any form, FIG. 2 illustrates an embodiment in which a plurality of auto igniter pellets 26, such as two pellets, are symmetrically disposed about the internal channel 24. A portion 28 of auto igniter pellets 26 may extend into the internal channel 24 such that a flame front generated by ignition of the auto igniter pellets travels up through the internal channel.

The composition of the auto igniter pellets is selected to ignite at a temperature greater than the maximum intended storage temperature of the rocket motor, but below the decomposition temperature of the igniter propellant 16 and a main propellant 32. A suitable composition for the auto igniter pellets 26 is a mixture of ammonium perchlorate and beta lactose anhydride which self ignites at a temperature of about 185° C. The volume of auto igniter is selected to insure substantially complete consumption of the igniter without an undue increase in pressure. Generally, a maximum pressure of less than 3,800 psia during the burn is desirable.

As illustrated in FIG. 1, the auto igniter pellets 26 are preferably bonded to housing 12 such as with a thermally conductive epoxy and then covered with the igniter 16. When exposed to a slow cook off threat, the auto igniter pellets 26 ignite and in turn ignite the igniter propellant 16. The resultant hot gases ignite the main propellant 32 of a gas propulsion system 30 (illustrated in FIG. 3) at a lower temperature than its auto ignition temperature and hence produces a reduced violence reaction and passes the slow cook off threat. As described below, when this feature is combined with a rocket motor having a variable area nozzle, an enhanced effect is achieved.

FIG. 3 illustrates a rocket motor 30 in cross-sectional representation as the gas propulsion system. The rocket motor 30 includes a main propellant 32 that communicates with the igniter throat 20 of the igniter 10. An exemplary composition for main propellant 32 is a mixture of ammonium nitrate and HTPB. When the igniter 10 ignites, a flame front will ignite the main propellant 32. Rocket motor 30 further includes a motor throat 34 and nozzle 36. In accordance with one embodiment, the motor throat 34 has a through bore 38 that forms an open area with a cross-section effective to discharge gas generated by the main propellant 32 at a sufficiently high volume that a pressure increase within the motor housing 40 remains below a rupture value for the housing. This approach insures that the igniter 10 lights which in turn lights the main propellant 32 grain. Unlike the prior art designs described above, the ignition event of this embodiment does not create an over pressure/closure release event. The rocket motor 30 is ignited at a low temperature and operates as a motor. But because the through bore 38 has a sufficiently large cross-sectional area, the system operates at a low pressure and a low thrust, lower than the nominal function pressure and thrust. This low thrust allows the system to be held in place by a missile launch mechanism, shipping crate, or its own system mass and prevents the system from being propulsive. The rocket motor 30 remains intact and does not generate any debris. In some instances, it may be recharged with main propellant 32 and igniter 10 and reused.

The through bore 38 has a variable cross sectional area, such that the area is larger when in a safe position than when in an armed position. Any suitable mechanism may be used to vary the cross sectional area, such as a valve. As shown in FIGS. 4A and 4B, one such valve 42 is positioned within the internal channel 34 and supported by the rigid sidewalls of the throat 34. When in "safe" operation (as shown in FIG. 4A), such as during storage or transport, the valve is in a first position and does not reduce the open cross-sectional area of the through bore 38 enabling low pressure, low thrust, discharge of combustion gases.

With reference to FIG. 4B, while in intended use "armed" operation, such as missile propulsion, valve 42 is in a second position that is effective to restrict discharge of gas generated by burning main propellant such that a pressure increase occurs within the rocket motor and high temperature, high thrust, combustion gas travels through a restricted area through bore 38' defined by surfaces of the valve 42 and sidewalls of the throat 34. Rapid expansion of these gases in nozzle 36 (of FIG. 3) generates thrust. An exemplary open (unobstructed) cross sectional area for the through bore 38 is 0.26 inch$^2$ and for a restricted (obstructed) cross sectional area the through bore 38' is 0.1 inch$^2$. An effective ratio, by area is open:restricted of from 2:1 to 6:1, and preferably from 2:1 to 3:1.

Figure 5A:
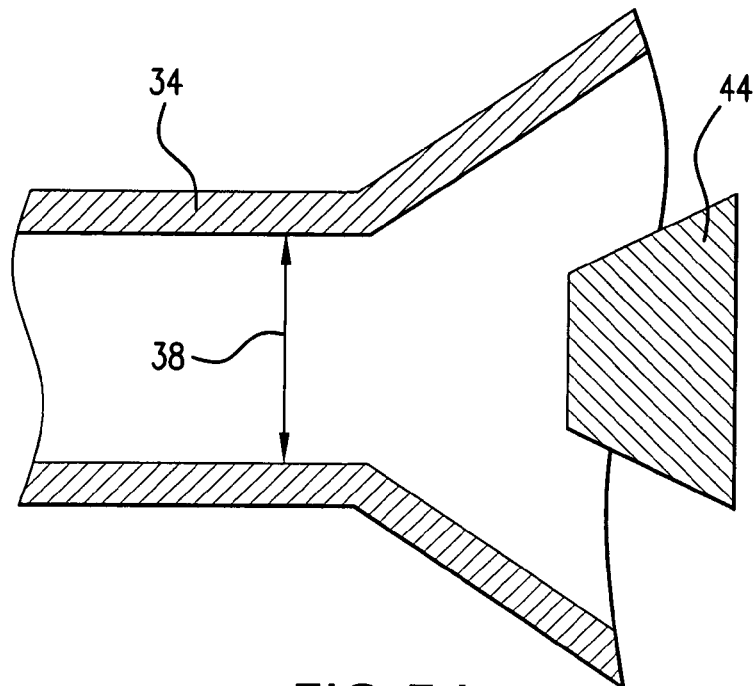
FIG. 5 is a cross-sectional view of an alternative valve illustrating the propulsion system in both a safe, FIG. 5A, and armed, FIG. 5B, position.
Figure 5B:
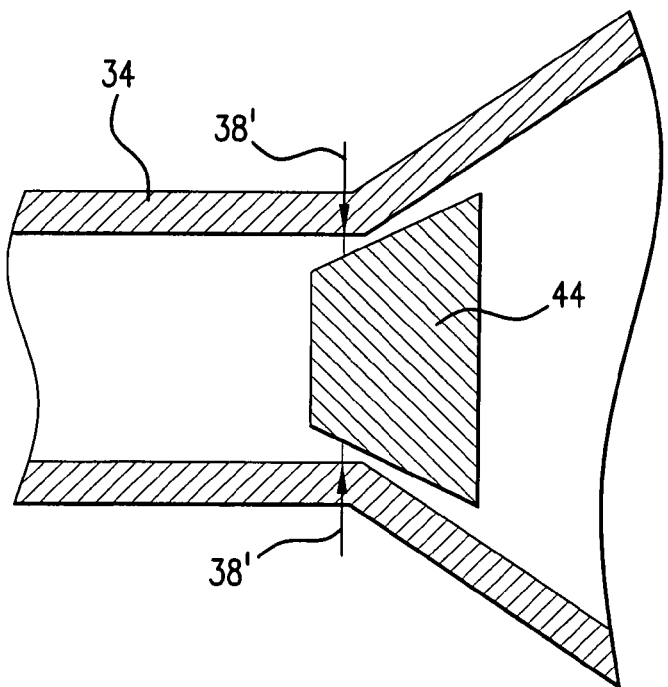

An alternative valve is illustrated in FIGS. 5A and 5B. When in the first, safe, position, a valve 44 is in a first position, spaced from motor throat 34 such that through bore 38 has a relatively large area. When in the second, armed, position, the valve 44 partially obstructs the throat 34, such that the through bore 38' has a reduced area.

Figure 6:
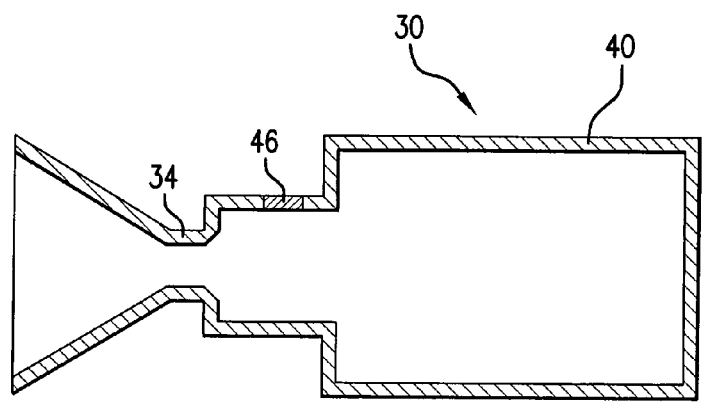
FIG. 6 is a cross-sectional view of another alternative valve illustrating the propulsion system in a safe position.

Another alternative valve is illustrated in FIG. 6. Rather than positioned in the throat 34, the valve 46 is positioned in the housing 40 of the rocket motor 30. This valve is open when the rocket motor is in a safe position and closed when the rocket motor is in an armed position.

Figure 7:
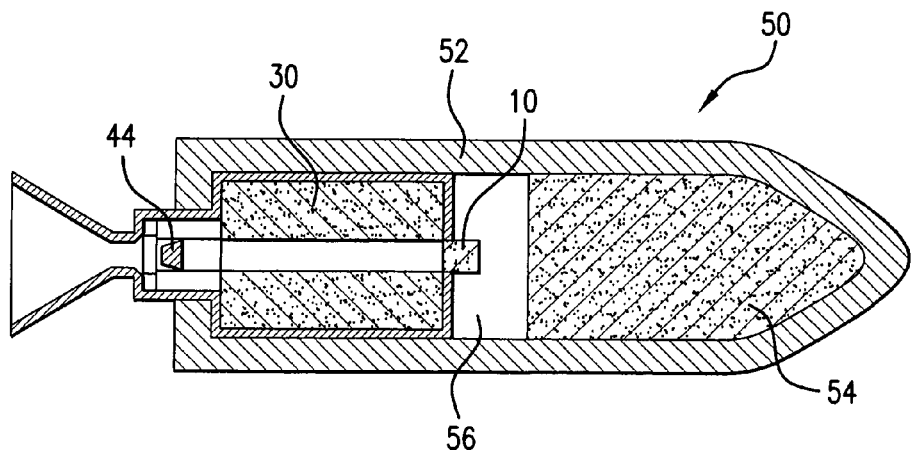
FIG. 7 is a cross-sectional view of ordnance utilizing a propulsion system as disclosed herein.

An application of the rocket motor 30, propulsion of ordnance 50, is illustrated in cross-sectional representation in FIG. 7, with valve 44 in the safe position. The ordnance 50 includes an aerodynamic housing 52 and an explosive charge 54 contained within a forward portion of the aerodynamic housing. The rocket motor 30 is contained within an aft portion of the housing 52. Additional components 56 may include telemetry, fuze, an onboard seeker (such as thermal imager), and an onboard computer. These additional components may be disposed in any available location within the housing 52. The rocket motor 30 may be used in any missile system that uses an igniter and would also provide a benefit to any system with a variable throat. It is anticipated, as a non-exclusive list, that this system would enhance the following programs: beyond visual range air-to-air missile, precision attack missile, loitering attack missile, crew exploration vehicle and its abort systems, non-line of sight missile, advance controllable thrust missile, multi-modal missile and compact kinetic energy missile. The system is also amenable for use with other systems and with other ignition systems requiring slow cook-off protection.

While a variable diameter gas release port is described above as being the throat, the gas release port may be positioned anywhere within the rocket motor that is in fluid communication with the igniter.

While the auto ignition pellets are described as being disposed between the throat and the igniter, it is within the scope of the invention for the auto ignition pellets to be located elsewhere in the propulsion system, while remaining in flame communication with at least one of the igniter propellant and the main propellant. Exemplary alternative locations include outside the igniter and separated from the igniter.

The following Example illustrates features of the above described auto igniter system.

A motor with an igniter assembly of the type illustrated in FIG. 1 with an unobstructed ("safe" position) throat diameter of 0.155 inch contained a molded cylinder of pyrogen igniter grain with an outside diameter of 0.906 inch, an inside diameter of 0.3 inch and a cylinder length of 0.85 inch. In a first run, five hemispherical auto igniter pellets having a diameter of 0.35 inch and a thickness of 0.12 inch were provided, while in a second run, two of the hemispherical auto igniter pellets were utilized. In the first run, the time to burn the igniter was 0.124 seconds and the maximum pressure in the igniter was 4380 psia, above a safety value design limit. In the second run, the time to burn the igniter was 0.151 seconds and the maximum pressure in the igniter was 2966 psia, within the safety value design limits of the igniter.

One or more embodiments of the present invention have been described. Nevertheless, it will be understood that various modifications may be made without departing from the spirit and scope of the invention. For example, a motor without a valve, where the throat area is controlled without a valve. Accordingly, other embodiments are within the scope of the following claims. Igniters using pyrotechnic materials rather than a pyrogen grain could incorporate the auto-ignition material with the same overall system benefit and effect.

What is claimed is:

1. A gas generating propulsion system, comprising:
   an igniter containing an igniter propellant;
   a rocket motor coupled to said igniter and having a housing containing a main propellant, a rocket motor throat and a nozzle;
   a volume of auto igniter in flame communication with at least one of said igniter propellant and said main propellant, said volume effective to substantially consume said igniter propellant without exceeding a maximum pressure design limit of said igniter; and
   a gas release port extending through a portion of said rocket motor, said gas release port having a variable diameter through bore in fluid communication with said main propellant, said through bore having a variable area that, in a safe operation position, forms an open area with a first cross-section effective to discharge gas generated by said main propellant such that a pressure increase within said housing remains below both a debris generating value and a propulsive thrust value for said rocket motor during transport and storage and, in an armed operation position, forms an obstructed area with a second cross-section effective to enable the system to generate a pressure increase and discharge high thrust combustion gases.

2. The gas generating propulsion system of claim 1 wherein said auto igniter is disposed within said igniter.

3. The gas generating propulsion system of claim 1 wherein said rocket motor throat functions as said through bore.

4. The gas generating propulsion system of claim 3 wherein an area ratio of said first cross-section to said second cross-section is from 2:1 to 3:1.

5. The gas generating propulsion system of claim 3 wherein a valve is aligned along a longitudinal axis of said through bore.

6. The gas generating propulsion system of claim 5 wherein said valve is in a first position when in said safe operation position and a second position when in said armed operation position.

7. The gas generating propulsion system of claim 6 wherein said valve in said second position obstructs said open area effective to restrict discharge gas generated by said main propellant such that a pressure increase within said housing generates thrust.

8. The gas generating propulsion system of claim 7 wherein an area ratio of said open area cross section when unobstructed to when obstructed is from 2:1 to 3:1.

9. An ordnance comprising:
   an aerodynamic housing;
   an explosive charge contained within a forward portion of said aerodynamic housing; and
   a propulsion system contained within an aft portion of said aerodynamic housing wherein said propulsion system includes an igniter containing an igniter propellant and a volume of auto igniter effective to substantially consume said igniter propellant without exceeding a maximum pressure design limit of said igniter, a rocket motor coupled to said igniter and having a housing containing a main propellant, a rocket motor throat and a nozzle, and a gas release port extending through a portion of said rocket motor, said gas release port having a variable diameter through bore in fluid communication with said main propellant, said through bore having a variable area that forms an open area with a cross-section effective to discharge gas generated by said main propellant such that a pressure increase within said housing remains below both a debris generating value and a propulsive thrust value for said rocket motor during transport and storage.

10. The ordnance of claim 9 wherein said rocket motor throat functions as said through bore forming an open area with a cross-section effective to discharge gas generated by said main propellant such that a pressure increase within said housing generates insufficient thrust to dislodge said ordnance from a restraint.

11. The ordnance of claim 10 wherein a valve is aligned along a longitudinal axis of said through bore.

12. The ordnance of claim 11 wherein said valve is in a first position during transport and storage and a second position when said system is deployed.

13. The ordnance of claim 12 wherein said valve in said second position reduces said open area effective to restrict discharge gas generated by said main propellant such that a pressure increase within said housing generates a thrust effective to propel said ordnance to a target.

14. The ordnance of claim 13 being a surface to surface missile.

15. A method to enhance safety of an ordnance during storage and transport comprising the steps of:
   providing an ordnance having an aerodynamic housing with an explosive charge contained within a forward portion of said aerodynamic housing and a propulsion system contained within an aft portion thereof;
   forming said propulsion system to have an igniter coupled to a rocket motor, said rocket motor including, in sequence aftward, a main propellant contained in a housing thereof, a throat and a nozzle;
   forming a through bore in said housing, said through bore having a variable diameter that when set in a first position has an open area with a cross-section effective to discharge gas generated by said main propellant whereby a pressure increase within said housing associated with the generated gas generates insufficient thrust to either generate debris or to dislodge said ordnance from a restraint; and
   disposing an auto igniter in flame communication with at least one of an igniter propellant contained within said igniter and said main propellant.

16. The method of claim 15 wherein said pressure increase when said variable diameter is set in said first position is less than 3,800 psia.

17. The method of claim 16 including forming said through bore as said throat and aligning a valve along a longitudinal axis of said through bore.

18. The method of claim 17 wherein said valve is in said first position during transport and storage and moved to a second position when said system is to be deployed.

19. The method of claim 18 wherein said valve in said second position reduces said open area to effectively restrict discharge gas generated by said propellant such that a pressure increase within said housing generates a thrust effective to propel said ordnance to a target.

* * * * *